Nov. 3, 1936. W. PAULUS 2,059,484
WIPER BLADE
Filed June 6, 1932
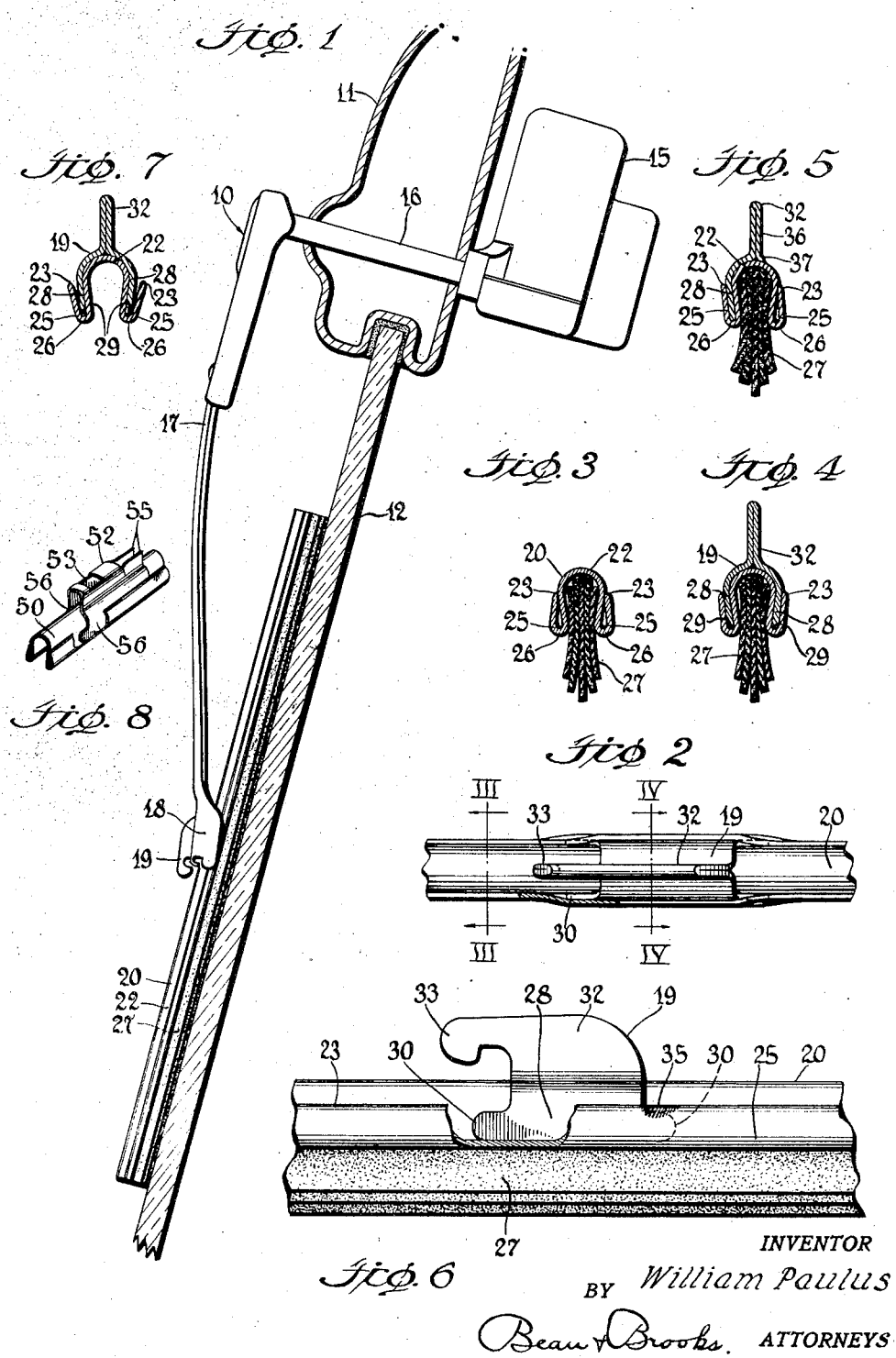
INVENTOR
William Paulus
BY Beau & Brooks, ATTORNEYS Patented Nov. 3, 1936

2,059,484

UNITED STATES PATENT OFFICE 2,059,484

WIPER BLADE

William Paulus, Buffalo, N. Y., assignor to Trico Products Corporation, Buffalo, N. Y.

Application June 6, 1932, Serial No. 615,732

21 Claims. (Cl. 15—250)

This invention relates to windshield cleaners and it has particular relation to cleaner blades and method of making them.

One object of the invention is to provide a wiper blade for windshield cleaners in which the amount of material employed is reduced to a minimum.

Another object of the invention is to provide a windshield cleaner blade in which its life and appearance are enhanced by preventing distortion of a flexible blade portion against sharp or abrupt surfaces and by manufacturing the blade in a neat compact form.

Another object of the invention is to provide a windshield cleaner blade in which the elements of the blade itself constitute the assembling devices for maintaining the blade as a compact unit without utilizing fastening elements such as screws, rivets, clamps or the like.

Another object of the invention is to provide a relatively narrow compact wiper blade that shall minimize wind resistance and thus avoid flapping or chattering of the blade regardless of the speed of the vehicle on which it is mounted.

Another object of the invention is to provide a method of manufacturing windshield cleaner blades having the advantages enumerated above.

In the drawing:

Fig. 1 is a fragmentary section of a windshield and vehicle body and an elevation of a windshield cleaner mounted thereon.

Fig. 2 is a fragmentary plan, on a larger scale, of a wiper blade.

Fig. 3 is a cross section taken substantially along the line III—III of Fig. 2.

Fig. 4 is a cross section taken substantially along the line IV—IV of Fig. 2.

Fig. 5 is a cross section similar to Fig. 4 illustrating another form of construction for the central portion of the blade.

Fig. 6 is a fragmentary elevation illustrating essential elements of construction of the wiper blade.

Fig. 7 is a cross section similar to Fig. 4; illustrating a step in assembling the elements of the blades; and Fig. 8 is a fragmentary perspective of blade elements showing another form of clip.

In practicing the invention a windshield cleaner 10 is mounted upon a vehicle body 11 which has a conventional windshield 12 supported therein. The cleaner comprises a motor 15 having an oscillatable shaft 16 extending therefrom for supporting at its outer end an upper end portion of a wiper arm 17. The lower end of the wiper arm has a flanged blade receiving and blade pivoting head 18 upon which a clip 19 of a wiper blade 20 is mounted in such manner as to provide for lateral alternate tilting of the blade as it is oscillated in the head across the windshield surface.

An outer sheet material holder 22 constitutes a substantially rigid portion of the blade, and it is bent into channel form with its marginal portions turned or bent outwardly and reversely until its edges 23 contact the body of the channel holder adjacent its web or bight. Thus substantially closed marginal beads 25 are provided having rounded surfaces 26 extending from a location slightly inside the channel holder, and then outwardly around the bead 25. These reversely turned flanges reinforce the channel and, therefore, it can be manufactured in narrow form. Thus in minimizing the width of the wiper, instead of adversely affecting the channel strength it is greatly reinforced and is much more sturdy and compact than the previously known types of wiper channels. A squeegee of flexible or resilient material, such as rubber, is clamped in the channel holder with the rounded beaded portions 26 pressed firmly against the squeegee sides to secure the latter in place. Thus when the squeegee is manipulated by oscillating the blade across the windshield, it is bent from left to right, as viewed in Figs. 3 and 4, and each side of the squeegee progressively contacts, with a rolling action, against the adjacent rounded surface 26 without being subjected to undue strain or sharp bending. The edges 23 of the holder are remote from the rounded portions and are so positioned by bending of the holder material as to be entirely beyond the range of movement of the squeegee. In this construction the beads, because of their uniformly rounded portions 26, do not cut into the rubber squeegee, and because of the rounded squeegee clamping surface, relatively narrow rubber portions or squeegees can be employed. In fact squeegees of approximately one-half the width, or less, of those previously employed are practical in this construction.

Referring to Figs. 4 and 6, the clip 19 is located approximately mid-way of the length of the holder and it is shown in the form of a saddle having side flanges 28 bent to conform to the shape of the channel holder and extending into loops or grooves 29 inside the beads 25. Oppositely disposed projections 30 extend longitudinally of the holder from inner extremities of the flanges 28 and the outer portion of the clip is in the form of a double wall fin 32 having a hook 33 at one of its outer corner extremities that normally extends through and loosely maintains the clip upon the flanged end of the wiper arm 17.

In bending the marginal portions of the material of the holder to form the beads 25, the material can be flat or it can be bent into channel form and then bent at its marginal flange portions to form the beads 25. In assembling the elements of the blade 20, the channel holder 22 is first bent into the form shown in Fig. 7 wherein the edges 23 are spaced from the channel wall to present the grooves 29 in open form. The clip 19 is then positioned in such manner that the flanges 28 fit closely into the bottom of the grooves and the flange edges 23 are then pressed closely against the sides of the flanges 28 to the position shown in Fig. 4. From the edges of the flanges 28 to the ends of the channel holder, the edges 23 are pressed closely against the channel sides as shown in Fig. 3. However, the portion of the edges immediately adjacent the edges of the flanges 28 overlap and entirely enclose the projections 30, including their edges opposite the bottoms of the groove 29. The projections are thus firmly anchored against movement in any direction.

Although the pressing of the channel edges 23 firmly about the flanges and projections of the clip 19 under ordinary conditions will maintain these blade elements in rigid assembled and reinforced relation, further precaution against accidental disassembly can be exercised by welding or soldering, as indicated at 35, the edges 23 to the channel body about the projections 30.

A suitable tool (not shown) can be inserted in the channel holder to maintain its shape while the edges 23 are being pressed into their final position. After removing the tool, the squeegee is inserted between the beads 25 and the channel clamped about the squeegee to maintain it in operative position. After mounting the blade assembled in this manner upon the arm 17, as shown in Fig. 1, the cleaner is then ready for operation.

In the form of the invention shown in Fig. 5, a clip 36 is provided which corresponds approximately to one-half of the clip 19. Since the construction of the clip 36 is otherwise substantially the same as the other clip, corresponding reference characters are employed to designate details thereof. Its fin 32, extends directly from the mid-portion of the channel member, and the flange 28 is mounted only in one bead 25. If desirable the channel holder and fin can be welded together, as indicated at 37, to ensure a rigid construction at their junction.

In Fig. 8, a channel 50 is shown constructed in the same manner as the channel 20 and a clip 52, of a different type from that shown in Figs. 4 and 6, is mounted upon the channel 50. The outer fastening portions, including a slot 53 and outwardly opening flanges 55 for receiving a conventional angular wiper arm end, are different from the other clip constructions described. However, flanges 56 of the clip 52 are constructed and anchored about the channel in substantially the same manner as the clip flanges 28.

In referring to reversely turned or bent flanges of a channel member, it is intended that such flanges designate those having portions turned or bent until their original edges project toward the bight or web of the channel member and these original edge portions lie substantially parallel to the main or body portions of the channel flanges.

A wiper blade constructed according to this disclosure is uniformly strong because no perforations for fastening elements are required at any point along the reinforced channels that might weaken it. In addition to this advantage, the clip 19 in its overlapping and interfitting relation with the channel flanges, further reinforces the central portion of the channel and the reversely lapped channel flanges, in turn, serve to reinforce the clip.

Since the wiper blade is relatively narrow, the distance from the blade pivoting head 18 across the blade to the windshield surface is minimized. Hence, in reversing the direction movement of the blade across the surface of the windshield, only slight play and tilting action are required. The assembling connections of blade, clip and wiper arm can thus be so compactly arranged as to avoid noise and insure uniformity of operation. As indicated above the overall blade width is only approximately twice its thickness, or its width may be even less than twice its thickness, because the rounded bead surfaces 26 ensure firm and even gripping of the squeegee without requiring the wide channel flanges of the type previously employed. A wiper blade constructed in this manner presents a very neat and compact appearance and since it is sturdy and relatively narrow, it is not disturbed or agitated by gusts of wind or extreme wind resistance caused by automobiles travelling at relatively high speeds.

Although only the preferred forms of the invention have been shown and described in detail it will be apparent to those skilled in the art that the invention is not so limited but that various changes may be made therein without departing from the spirit of the invention or from the appended claims.

What is claimed is:

1. A method of making a windshield wiper blade which comprises bending a strip of material into channel form, turning the marginal portions of the channel member thus formed into substantially double wall relation to provide beaded flange portions, and pressing the flanges toward each other against a flexible squeegee to anchor the latter in the channel.

2. A method of making a windshield wiper blade which comprises bending the marginal side portions of a strip of material toward each other into substantially double wall relation to form beaded side extremities, and bending the beaded strip into channel form and against the sides of a flexible squeegee to secure the latter in the channel thus formed.

3. A method of making a windshield wiper blade which comprises bending a strip of material into channel form, outwardly turning the marginal portions of the channel member thus formed into substantially double wall relation to provide beaded flange portions, anchoring a clip in the outwardly turned marginal portions, and securing a flexible squeegee in the channel member.

4. A method of making a windshield wiper blade which comprises bending a strip of material into channel form, reversely turning the marginal portions of the channel member thus formed to provide open grooves, positioning a clip upon the channel member with portions of its extremity extending into the grooves, and closing the groove walls against the clip to anchor the latter.

5. A method of making a windshield wiper blade which comprises bending a strip of material into channel form, outwardly turning in substantially folded relation and rounding the marginal portions of the channel member thus formed to provide open grooves, positioning a clip upon the channel member with portions of its extremity extending into the grooves, closing the groove walls against the clip to anchor the latter and securing a squeegee in the channel with its sides engaging the beginning of the rounded portions.

6. A method of making a windshield wiper blade which comprises bending a strip of material into channel form, reversely turning and rounding the marginal portions of the channel member thus formed to provide open grooves, forming a clip with flanged portions, inserting the flanged portions into the grooves, closing the groove walls against the clip to anchor the latter, and securing a squeegee in the channel by pressing the channel walls against the squeegee sides.

7. A windshield wiper blade comprising a strip of material having marginal side portions bent in opposed relation toward and against the body of the strip to form beaded side extremities, said strip being of channel form, and a flexible squeegee disposed in the channel portion of the blade with the beaded side extremities pressing against the sides of the squeegee to secure the latter in said channel portion.

8. A windshield wiper blade comprising a strip of material having a marginal side portion bent toward and substantially against the body of the strip to form a beaded side extremity, said strip being of channel form, a wiper arm connecting clip seated substantially upon the outer portion of the channel shaped strip, said clip having a portion extending into and overlapped in closely engaging relation by the bent and beaded side portion, and a flexible wiping element composed of strip material disposed in the channel shaped strip with the edge extremities of the latter pressing against the sides of the wiping element.

9. A windshield wiping blade comprising a channel member having opposed side flanges and having an intermediate portion integrally carrying the side flanges, a flexible wiping member secured between said side flanges, and a clip having a flange mounted upon the channel member, one channel flange and the clip flange including interconnected anchoring means in the form of a fold on one flange embracing the other flange.

10. A windshield wiper blade comprising a flexible squeegee, a relatively rigid channel member having the squeegee disposed in the channel thereof, and a clip provided with means for connecting it to a windshield wiper arm, said channel member having marginal flange portions at least partially enclosing portions of the clip and rigidly securing the latter to the channel member.

11. A windshield wiper blade comprising a flexible squeegee, and a relatively rigid channel member having marginal portions of its channel flanges extending in outwardly turned relation and lying substantially flat against the outer flange sides of the channel and forming rounded beaded portions over which the squeegee is adapted to flex, said squeegee being secured in the channel member between the rounded beaded portions.

12. A windshield wiper blade comprising a flexible squeegee, and a relatively rigid channel member having its channel flanges extending outwardly to form rounded beaded portions, the extremities of the outwardly extending portions substantially contacting the sides of the channel, said squeegee being secured between the flanges of the channel member with its sides engaged by the beaded portions whereby the squeegee is adapted to ride in a rolling action upon the rounded beaded portions.

13. A windshield wiper blade comprising a flexible squeegee, a relatively rigid channel member having clip receiving hollow beaded edge portions firmly embracing the squeegee on opposite sides thereof, a clip having portions mounted in the beaded portions in interlocking relation therewith for securing said clip to the blade, and means for securing the clip to a windshield wiper arm.

14. A windshield wiper blade comprising a flexible squeegee, a relatively rigid channel member receiving a part of the squeegee in its channel and having its channel flanges extending outwardly and in substantially folded relation toward the bight of the channel member to form beaded squeegee clamping channel portions, and a clip having portions thereof anchored between the walls constituting the beaded channel portions.

15. A windshield wiper blade comprising a flexible squeegee, a relatively rigid channel member having its channel flanges extending outwardly and in reversely turned relation, the turned edge portion of the flanges substantially contacting the sides of the channel, said squeegee being secured in the channel between the outwardly extending channel flanges, and a clip having its inner extremities anchored to and overlapped by the outwardly extending reversely turned channel flanges.

16. A windshield wiper blade comprising a flexible squeegee, a relatively rigid channel member receiving a part of the squeegee in its channel and having portions of its channel flanges extending in substantially folded relation to form beaded squeegee clamping portions, and a clip having portions straddling the channel member, said straddling portions extending into and being anchored between the walls constituting said portions extending in substantially folded relation.

17. A windshield wiper blade comprising a flexible squeegee, a relatively rigid channel member having its channel flanges extending outwardly in substantially folded relation toward the bight of the channel member to form beaded squeegee clamping portions, a clip having a flange disposed against the channel member, and a projection formed upon the clip flange, the outwardly extending portions of the channel flanges in their folded relation being lapped over the projection and providing a pocket for receiving the projection and anchoring the latter against withdrawal from the channel member.

18. A windshield wiper blade comprising a flexible squeegee, a relatively rigid channel member receiving a part of the squeegee in its channel and having its channel flanges extending in substantially folded relation to form beaded squeegee clamping portions, and a wiper arm receiving clip straddling the channel member and having its extremities disposed in the extended folded portions of the channel flanges, said extremities of the clip having projections embraced by the extended folded portions of the channel flanges for anchoring the clip.

19. A windshield wiper blade comprising a flexible wiping element of strip material, a relatively rigid channel member having opposed side flanges and having an intermediate bight portion forming with the flanges a substantially U-shape in cross section, the outer marginal portion of each side flange having substantially contacting double walls and having a marginal bight portion providing continuous wall structure joining said double walls of each flange, said wiping element being secured between the opposed side flanges for flexing operation against said marginal bight portions of the double walls.

20. A window wiper comprising a channeled holder, a squeegee secured in the channel of the holder, and an attaching clip seating on and contacting the back portion of the holder, said clip having a flange portion overlying a side of the holder, and said holder having a part extending outwardly in folded relation over the flange portion of the clip and secured in pressed relation into interlocking engagement with the latter to secure the clip to the holder.

21. In a windshield cleaner assembly, a flexible wiping element, a holder having side walls and being U-shaped in cross section for receiving the wiping element, the side walls of said holder extending in turned relation back upon themselves to stiffen the holder, an attaching clip disposed substantially medially of the holder, said attaching clip being of U-shape and having side walls clamped between the side walls of the holder and the turned portions thereof, wall portions of the clip adjacent the bight thereof being formed in substantially pressed-together relation to provide a wiper arm connecting structure.

WILLIAM PAULUS.